United States Patent [19]

Hostetler et al.

[11] 4,358,651
[45] Nov. 9, 1982

[54] MACHINE SAFETY GUARD

[75] Inventors: Thomas E. Hostetler, New Carlisle; Ted J. Ellis, Jr., Goshen, both of Ind.

[73] Assignee: Bristol Corporation, Elkhart, Ind.

[21] Appl. No.: 233,927

[22] Filed: Feb. 12, 1981

[51] Int. Cl.³ .................. H01H 9/20; H01H 3/20
[52] U.S. Cl. ..................... 200/334; 200/153 T;
200/335; 200/332
[58] Field of Search ............... 200/334, 153 T, 335,
200/337, 47, 331, 332, 330

[56] References Cited

U.S. PATENT DOCUMENTS

| | | | |
|---|---|---|---|
| 1,682,549 | 8/1928 | Billerbeck | 200/331 |
| 2,906,842 | 9/1959 | Brin | 200/153 T |
| 3,699,283 | 10/1972 | Ustin | 200/47 |
| 3,931,911 | 1/1976 | Kohl | 200/153 T |
| 4,296,291 | 10/1981 | Johnson | 200/331 |

Primary Examiner—Willis Little
Attorney, Agent, or Firm—Marmaduke A. Hobbs

[57] ABSTRACT

A machine safety guard for stopping a machine during any phase of operation to prevent injury to workers in which a guard lever is disposed between the worker and the hazardous area of the machine and is connected on one end to a pivot shaft. An activating arm extends from the shaft and has a post for operating a microswitch which is connected to the emergency circuit of the machine. When the guard lever is touched the lever pivots on the shaft, thereby lowering the post from the microswitch, causing the emergency circuit to stop the machine. A counterweight is used to control the sensitivity of the guard lever.

10 Claims, 5 Drawing Figures

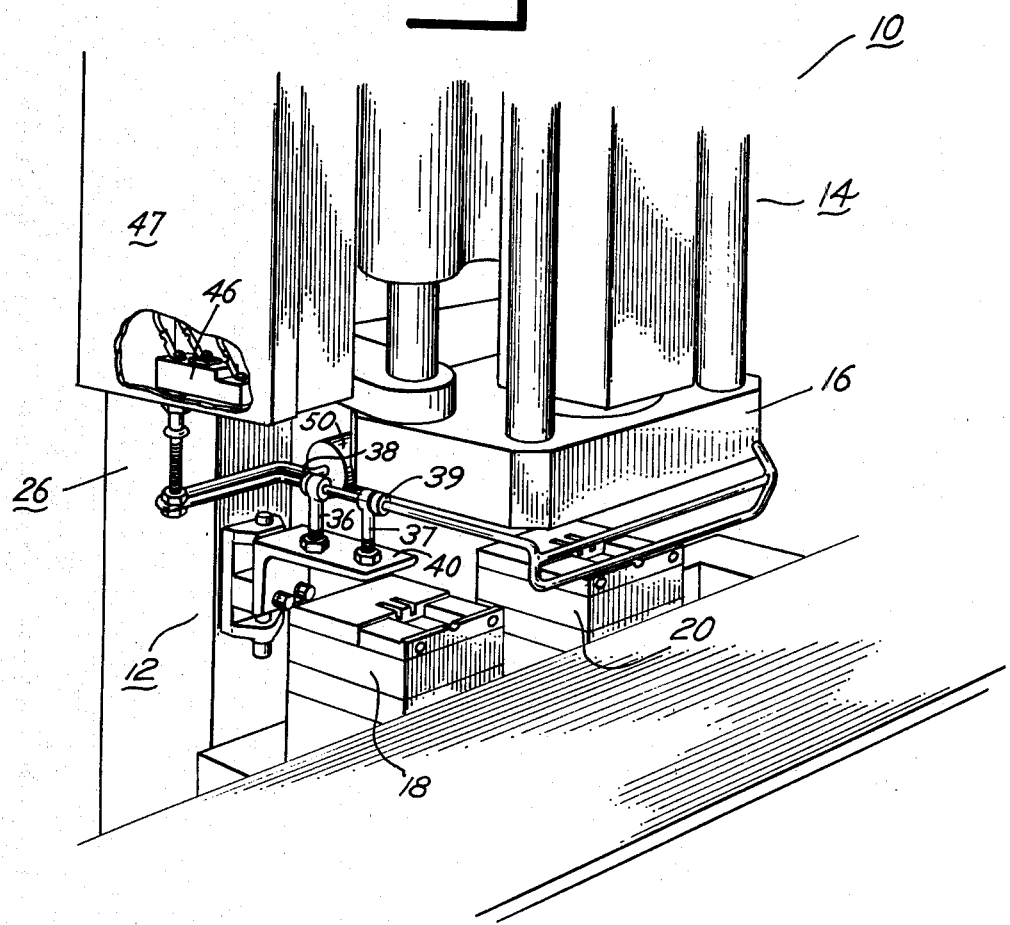
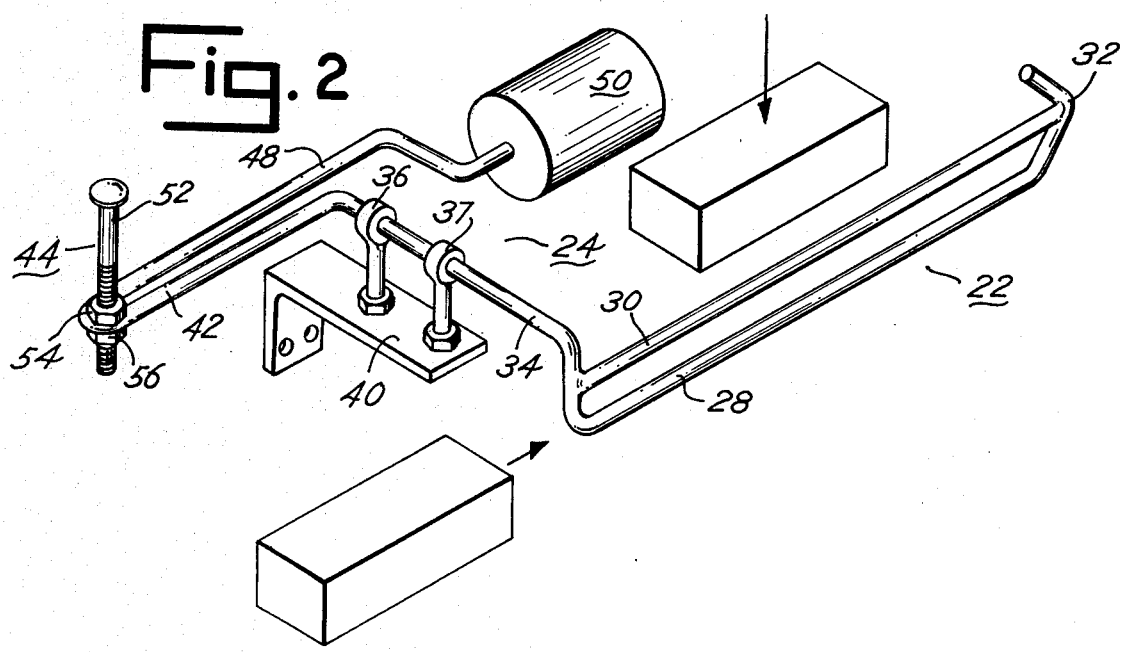

MACHINE SAFETY GUARD

BACKGROUND OF THE INVENTION

This invention pertains to a guard mechanism for production assembly machines which require hand manipulation of product materials in areas close to operating machine parts which can cause injury, and more particularly pertains to a guard for a shuttle type injection molding machine.

Many manufacturing processes include mechanical operations performed by automated machines which are preceded by the operator's hand manipulation of materials or equipment in hazardous areas close to machine parts which can cause injury to the operator. For example, the production of molded plugs on electrical cords is frequently performed by shuttle type injection molders which permit the mold operator to prepare the materials for one plug while another plug is being formed and cured in the mold. The mold includes one upper mold piece with a material injection ram, and two lower mold pieces on a shuttle carriage. The carriage moves in one direction or the other beneath the upper mold piece, to mate one or the other of the lower mold pieces with the upper mold piece as the upper mold piece is lowered toward the carriage at the beginning of the operating cycle. While material is being injected into the mold, and the curing process is carried out, the second lower mold piece, which is exposed and open, can be readied for the next plug formation. Hence, in the manufacture of electrical cords, while one plug is being formed, the mold operator can place the wires and terminals for another plug in the proper position in the open lower mold, and when the first mentioned plug is completed and the mold opens, another operating cycle can be started immediately to move the carriage and position the second lower mold piece beneath the upper mold piece. While the second plug is being formed, the completed product in the first lower mold piece can be removed, and materials for a third plug placed therein. In a typical shuttle injection molder, each cycle of the molding machine is initiated when the mold operator depresses a foot pedal, which begins a cycle wherein the carriage shift to move a lower mold piece beneath the upper mold piece, the upper mold piece is lowered and mates with the lower mold piece, material is injected into the mold, the injected material is cured, and the mold is opened. A single depression of the foot pedal begins the cycle, which continues uninterrupted until the mold opens after curing has occurred.

One of the problems encountered with shuttle type injection molders is that, as the carriage moves, materials placed in the lower mold piece, such as, in the example, the wires and terminals of an electrical plug, may become slightly mispositioned. The natural and almost instantaneous reaction of the molding machine operator is to reach for the lower mold and correctly position the materials therein. Danger arises in that once the operating cycle of the machine begins, it continues to completion, and if the mold operator, in his attempt to reposition the materials in the lower mold, places his fingers between the upper and lower mold pieces and the mold closes, the operator's hand can be severely injured. Emergency stop circuitry is provided for the molding machine which, upon depression of an emergency button, will interrupt the mold cycle and open the mold; however, since accidents of this type normally occur relatively quickly, the operator is usually unaware of the danger until after the injury has occurred. Although he may be able to press the emergency button and open the mold before completion of the operating cycle, normally this will not be done until the mold has closed fully and the injury has occurred.

It is known in the prior art to provide guards in the area of the carriage, which, if moved from a neutral position, prevent operation of the foot pedal to start the operating cycle. These previous devices have not been completely satisfactory, however, in that on shuttle molds having relatively long carriages, the mechanical linkage of the previous guards has been such that, to operate the interrupt circuitry of the guard devices, deflection at the far end of the guard must be relatively extreme, often more than occurs from an errantly placed finger or hand. Another problem with the previous devices has been that only interruption of the operation of the foot pedal occurs; the actual mold cycle, once initiated, is not broken. Hence, if the foot pedal is depressed to start the cycle before the interrupt circuitry is activated, the mole will continue through its cycle and injury to the operator can occur. The previous devices are useful only in situations wherein the interrupt circuitry is activated prior to an attempt to initiate the mold cycle, in that the previous devices prevent the start of the cycle but do not interrupt the cycle once it has begun.

SUMMARY OF THE INVENTION

One of the objects of the present invention is to provide a machine safety guard which will interrupt the operating cycle of production machinery at any stage during the operation thereof if the operator is in danger of injury, and which is activated upon only slight movement of a guard lever, even at the extreme end of a long mold guard, so that errantly placed fingers or hands anywhere within the hazardous area of the machine will interrupt the cycle.

Another object of the present invention is to provide a machine safety guard which can be used advantageously on various types of production machine, and which can be adjusted to the desired sensitivity for detecting the presence of objects and for stopping the machine in response thereto.

These and other objects are accomplished in the present invention by providing a guard lever, in front of the hazardous area wherein injury may occur, which is connected to an actuating post for a switch, preferably a microswitch. Circuitry is provided to connect the microswitch to the emergency stop circuitry in the machine, and pivot means is provided between the arm and lever so that even slight movement of the lever moves the actuating post to alter the position of the microswitch and produce the same result as when the emergency stop button is depressed to interrupt the operating cycle of the machine. An arm with a counterweight thereon is connected to the lever to control the force required to move the lever and the microswitch activating post.

Further objects and advantages of the present invention will become apparent from the following detailed description and the accompanying drawings.

BRIEF DESCRIPTION OF THE DRAWINGS

FIG. 1 is a perspective view of an injection shuttle molder having a machine safety guard embodying the present invention;

FIG. 2 is a perspective view of the guard shown in FIG. 1;

DETAILED DESCRIPTION OF THE PREFERRED EMBODIMENT

Figure 3:
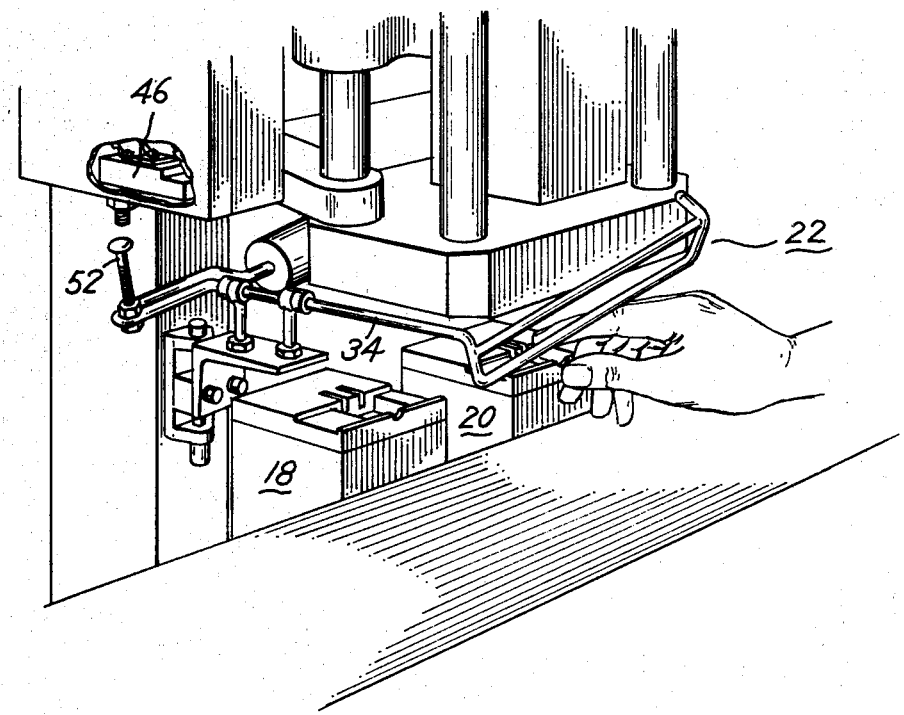
FIG. 3 is a perspective view of the shuttle molder and guard showing the guard in the tripped position for stopping the operation of the molder.
Figure 4:
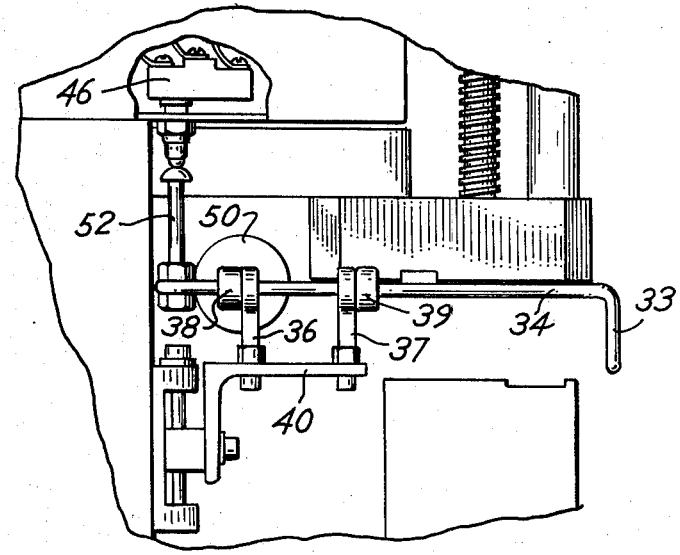
FIG. 4 is a fragmentary end view of the guard and shuttle molder.
Figure 5:
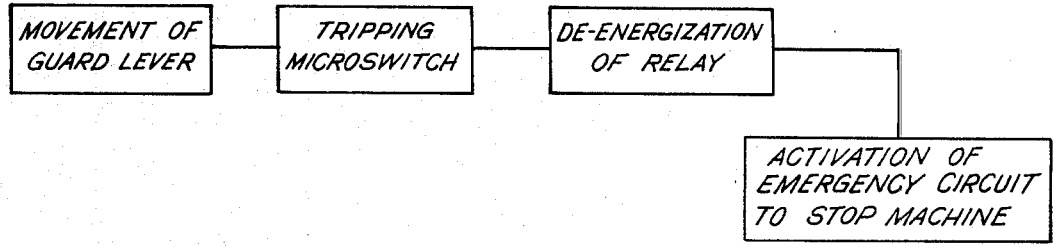
FIG. 5 is a block diagram of the operation of the guard of the present invention.

Referring now more specifically to the drawings, and to FIG. 1 in particular, numeral 10 designates a shuttle type injection molder having a machine safety guard 12 embodying the present invention for guarding the hazardous work area of the molder and stopping the operation of the molder if articles are mispositioned or if the mold operator's hands are in a position where injury could occur. The present machine safety guard may be used advantageously on many different types of machines, and the injection molder is given as merely one example of an advantageous use of the safety guard.

Injection molder 10 includes an injection ram 14 and an upper mold piece 16 which moves downwardly at the beginning of every cycle to mate with one or the other of lower mold pieces 18 and 20. At the end of the cycle, the injection ram and upper mold piece are lifted away from the lower mold piece. Lower mold pieces 18 and 20 move back and forth on a shuttle carriage so that at the initiation of a new production cycle one lower mold piece is moved beneath the upper mold piece, and the other lower mold piece is in a position to be emptied and readied for a new production cycle. Machine safety guard 12 protects the area between the upper and lower mold pieces regardless of which of the lower mold pieces is beneath the upper mold piece; however, the guard does not interfere with loading and unloading the lower mold piece which is not in position beneath the upper mold piece.

Machine safety guard 12 includes a guard lever 22 disposed at the edge of the hazardous work area between the mold operator and the area in which the upper and lower mold pieces are brought together. A pivot and touch control assembly 24 connects guard lever 22 to an emergency circuit activaton system 26 for stopping the production machine at any time during the operating cycle, if the guard lever is raised.

Guard lever 22 includes rods 28 and 30 of sufficient length to cover the length of the dangerous area between the upper and lower mold pieces. The guard lever may have more or fewer rods, or may be a single piece; however, the rod construction is preferred in that visibility of the work area between the mold pieces is not so greatly encumbered as if a solid piece were used for the lever. One end of the lever has an angular end piece 32, and the other end of the lever has a substantially vertical end piece 33 connected to a pivot shaft 34 of the pivot and touch control assembly. The angular end of the guard lever causes the guard lever to rise up and over objects which encounter the lever from that end, thereby triggering the emergency circuit activation system to shut off the machine. The pivot shaft is connected to vertical end piece 33 at the top thereof, extends at right angles to the guard lever, and is journaled in eye bolts 36 and 37 attached to a bracket 40 on the production machine. Collars 38 and 39 disposed on shaft 34 hold the shaft in the proper position relative to eye bolts 36 and 37. Objects which encounter the guard lever from the side of end piece 33 also tend to raise the lever because of the attachment of the pivot shaft at the top of end piece 33. An activating arm 42 extends perpendicularly from pivot shaft 34 at the opposite end, and in the opposite direction, from guard lever 22. A post 44 extends upwardly from the activating arm to a switch 46 disposed in a housing 47. Preferably switch 46 is a microswitch or other easily tripped device. A counter balance arm 48 is disposed on the opposite side of pivot shaft 34 from the activating arm, and has a counterweight 50 adjustable thereon. In the embodiment shown, activating arm 42 and counter balance arm 48 form a loop, and post 44 comprises a bolt 52 attached in the loop by nuts 54 and 56 engaged on the threads of the bolt above and below the loop. It should be understood that various other constructions are possible; however, the loop construction permits adjustability of post 44 along the slot in the loop formed by arms 42 and 48 to properly engage the post with the microswitch, and is therefore preferred because of the advantages therefrom in installing the safety guard. The counter balance arm and counterweight hold lever 22 in the down position and post 44 upwardly against microswitch 46. If the lever is raised, thereby lowering post 44 from microswitch 46, the microswitch is tripped, and the emergency circuitry of the production machine is activated to turn off the machine. Counterweight 50 can be adjusted on counter balance arm 48 to control the sensitivity of guard lever 22 and the amount of force necessary to raise the arm.

Microswitch 46 is electrically connected to a relay, and the relay is connected to the emergency circuit of the production machine. The type of relay used depends on the wiring of the emergency circuit in the machine. The relay will be selected to have the number of normally opened and normally closed switches corresponding to the normally opened and normally closed circuits of the overall emergency circuit. It is preferred that the relay be in a normally energized condition during the operation of the production machine so that failure of the relay, causing the deenergization thereof, will stop the machine. Hence, failure of the relay would be detected immediately, and the machine could not be operated with a malfunctioning safety guard caused by relay failure.

In the use and operation of a machine safety guard embodying the present invention, bracket 40 is connected to the production machine, and eye bolts 36 and 37 are connected thereto so that lower rod 28 of guard lever 22 is substantially at the height of the upper surface of the lower mold pieces 18 and 20. Wehn a lower mold piece is in position below the upper mold piece, the guard lever acts as a barrier between the mold operator and the area of possible injury between the upper and lower mold pieces. The location of pivot shaft 34 at the upper corner of the guard lever permits lower mold piece 18 to pass under the pivot shaft when moving between the unloading and loading position to the left of the guard and the material injecting position beneath upper mold piece 16. Housing 47, with microswitch 46, is attached to the machine so that post 44 is disposed against microswitch 46 and is held thereagainst by counterweight 50 on counter balance arm 48.

Wehn the lower mold pieces are in the position shown in FIG. 1, lower mold piece 18 can be unloaded and loaded to the left of the pivot shaft, and, in this position, the machine safety guard causes no interference with the loading and unloading procedure. After properly loading lower mold piece 18, the molding machine operator activates a switch to initiate the molding machine cycle. Lower mold 18 moves on the shuttle carriage to the right as shown in FIG. 1, to a position beneath upper mold 16. The upper mold is lowered to contact the lower mold and the injection and curing of the plastic or other material ensue. If the mold operator accidentally places his hand on or near the lower mold piece as it moves under the upper mold piece and bumps the left side of the guard lever, the guard lever will be raised, pivoting on pivot shaft 34 in eye bolts 36 and 37. Post 44 will be lowered away from microswitch 46, thereby tripping the microswitch. This causes the de-energization of the relay and activation of the existing emergency circuit in the production machine to stop the machine and open the mold, the same as if the emergency stop button were pressed. Thus, even if the mold has begun to close, the closing will automatically stop and the mold will open before injury to the operator can occur.

When lower mold piece 18 is in position beneath upper mold 16, lower mold 20 will be to the right of guard lever 22 in a position where loading and unloading of lower mold 20 can be performed. When the next production cycle is begun, lower mold 20 will move on the shuttle carriage to the left as shown in FIG. 1 to a position beneath upper mold 16. If the operator's arm or hands or other misplaced items come in contact with angular end piece 32 of guard lever 22, the guard lever will ride up and over the errantly placed object. The raising of the guard lever again lowers post 44 away from microswitch 46, thereby de-energizing the relay and activating the emergency circuit in the machine. When the machine is stopped by the emergency circuit, a new production cycle cannot be initiated until the operator intentionally actuates the machine's cycling switch (such as a foot pedal switch).

The force required to raise guard lever 22 is adjusted by moving counterweight 50 on counter balance arm 48. Thus the lever can be made as sensitive to touching on either end as is desirable for the particular machine and the circumstances in which the machine is operated. The counter balance arm and weight can be eliminated, and a spring used to hold the safety guard in the operating position; however, the counterweight is preferred because of the adjustability thereof. The length of guard lever 22 can be varied depending upon the length of the hazardous area between the upper and lower mold pieces, and the length of activating arm 42 and the position of post 44 can be made to function properly on the particular machine on which the safety guard is used.

Injuries to production workers can be substantially reduced with the present safety guard since the machine will be stopped at any point of operation. The present safety guard also has the tendency of making the producton machine operators more careful, in that they become aware of the possibility of injury, particularly if they accidentally touch the lever. By touching the lever and having to reset the machine, even if he would not have been injured by the machine at that particular time, the operator becomes more firmly aware of danger and will take care to not touch the lever.

Although one embodiment of a machine safety guard has been shown and described herein, various changes may be made without departing from the scope of the present invention.

We claim:

1. A safety guard for a production machine having an emergency circuit for stopping the machine, said safety guard comprising a guard lever disposed between the hazardous area of the machine where injury can occur and the machine operator and, in a first position, forming a shield restricting access to said hazardous area and, in a second position, permitting free access to said area, pivot means for connecting said guard lever at one end to the machine, an activating arm connected to said pivot means, a switch operated by movement of said arm and said lever, a generally horizontally positioned balance arm connected to said activating arm, a weight disposed and moveable longitudinally on said balance arm for controlling the force required to move said lever and to operate said switch, and an electric circuit connecting said switch to the emergency circuit of the production machine so that movement of said guard lever to said second position interrupts the machine operating cycle through the emergency circuit.

2. A safety guard as defined in claim 1 in which said pivot means includes a shaft disposed between said activating arm and said guard lever, generally perpendicular to said activating arm and said guard lever, and a bracket on said machine for rotatably holding said shaft.

3. A safety guard as defined in claim 2 in which one end of said shaft is connected to said guard lever and the other end of said shaft is connected to said activating arm.

4. A safety guard as defined in claim 2 in which said guard lever extends away from said shaft to one side of said bracket, and said activating arm extends away from said shaft to the other side of said bracket, in the opposite direction from said guard lever.

5. A safety guard as defined in claim 4 in which said balance arm extends from said activating arm perpendicular to said shaft, and said weight is disposed on said balance arm on the same side of said bracket as said guard lever.

6. A safety guard as defined in claim 4 in which one end of said shaft is connected to said guard lever, and the other end of said shaft is connected to said activator arm.

7. A safety guard as defined in claim 1 in which a shaft is connected to one end of said guard lever and is disposed generally perpendicular thereto, and said activating arm is connected to the end of said shaft opposite the end connected to said lever and extends generally perpendicular to said shaft in the opposite direction from said lever.

8. A safety guard as defined in claim 7 in which a balance arm extends from said activating arm past said shaft on the same side as said lever, and a counterweight is disposed on said balance arm on the same side of said shaft as said guard lever.

9. A safety guard as defined in claim 1 in which one end of said guard lever includes a substantially vertical end piece connected at the top thereof to said pivot means, and the opposite end of said guard lever includes an angular end piece for causing said guard lever to rise up when encountered by objects on that side.

10. A safety guard as defined in claim 1 in which a post is connected to said activating arm and operates said switch.

* * * * *